US012666442B2

(12) United States Patent
Si et al.

(10) Patent No.: US 12,666,442 B2
(45) Date of Patent: Jun. 23, 2026

(54) METHOD AND APPARATUS FOR DISCONTINUOUS RECEPTION FOR A GROUP OF USER EQUIPMENTS

(71) Applicant: Samsung Electronics Co., Ltd., Suwon-si (KR)

(72) Inventors: Hongbo Si, Allen, TX (US); Aristides Papasakellariou, Houston, TX (US); Jeongho Jeon, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 18/350,651

(22) Filed: Jul. 11, 2023

(65) Prior Publication Data

US 2024/0049248 A1    Feb. 8, 2024

Related U.S. Application Data

(60) Provisional application No. 63/392,783, filed on Jul. 27, 2022.

(51) Int. Cl.
*H04W 72/232*    (2023.01)
*H04W 76/28*    (2018.01)

(52) U.S. Cl.
CPC ......... *H04W 72/232* (2023.01); *H04W 76/28* (2018.02)

(58) Field of Classification Search
CPC .............. H04W 72/232; H04W 76/28; H04W 52/0216; H04W 72/0446; H04W 72/231; H04L 5/0023; H04L 5/0053; Y02D 30/70
See application file for complete search history.

(56) References Cited

U.S. PATENT DOCUMENTS

2020/0029315 A1    1/2020    Lin et al.
2020/0413475 A1    12/2020    Wei et al.
(Continued)

OTHER PUBLICATIONS

International Search Report and Written Opinion issued Nov. 8, 2023 regarding International Application No. PCT/KR2023/010744, 7 pages.

(Continued)

*Primary Examiner* — Nicholas A Jensen
*Assistant Examiner* — Ayodele Lawrence Olubodun

(57)    ABSTRACT

Methods and apparatuses for discontinuous reception (DRX) for a group of user equipments (UEs). A method of a UE in a wireless communication system includes receiving higher layer parameters and determining DRX ON durations based on the higher layer parameters and reception occasions for physical downlink control channels (PDCCHs) based on the higher layer parameters, wherein a first PDCCH from the PDCCHs provides a downlink control information (DCI) format. The method further includes receiving the first PDCCH in at least one reception occasion from the reception occasions and determining based on an indication in the DCI format, whether to receive a second PDCCH in at least one DRX ON duration from consecutive $N_{DRX}$ DRX ON durations that are after the reception of the first PDCCH, wherein the indication in the DCI format is a bitmap of size $N_{DRX}$, and $N_{DRX}$ bits in the bitmap are respectively associated with the $N_{DRX}$ DRX ON durations.

20 Claims, 10 Drawing Sheets

(56) References Cited

U.S. PATENT DOCUMENTS

| | | | |
|---|---|---|---|
| 2021/0120577 A1* | 4/2021 | Jiang | H04W 72/23 |
| 2021/0314866 A1 | 10/2021 | Lee et al. | |
| 2021/0360736 A1 | 11/2021 | Chen | |
| 2022/0124623 A1* | 4/2022 | Seo | H04W 72/23 |
| 2022/0159574 A1* | 5/2022 | Islam | H04W 52/0229 |
| 2022/0191793 A1 | 6/2022 | Murray et al. | |
| 2023/0051303 A1* | 2/2023 | Seo | H04W 52/0274 |
| 2025/0227618 A1* | 7/2025 | Seo | H04W 76/28 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
Extended European Search Report issued Jul. 18, 2025 regarding Application No. 23846960.5, 8 pages.

* cited by examiner

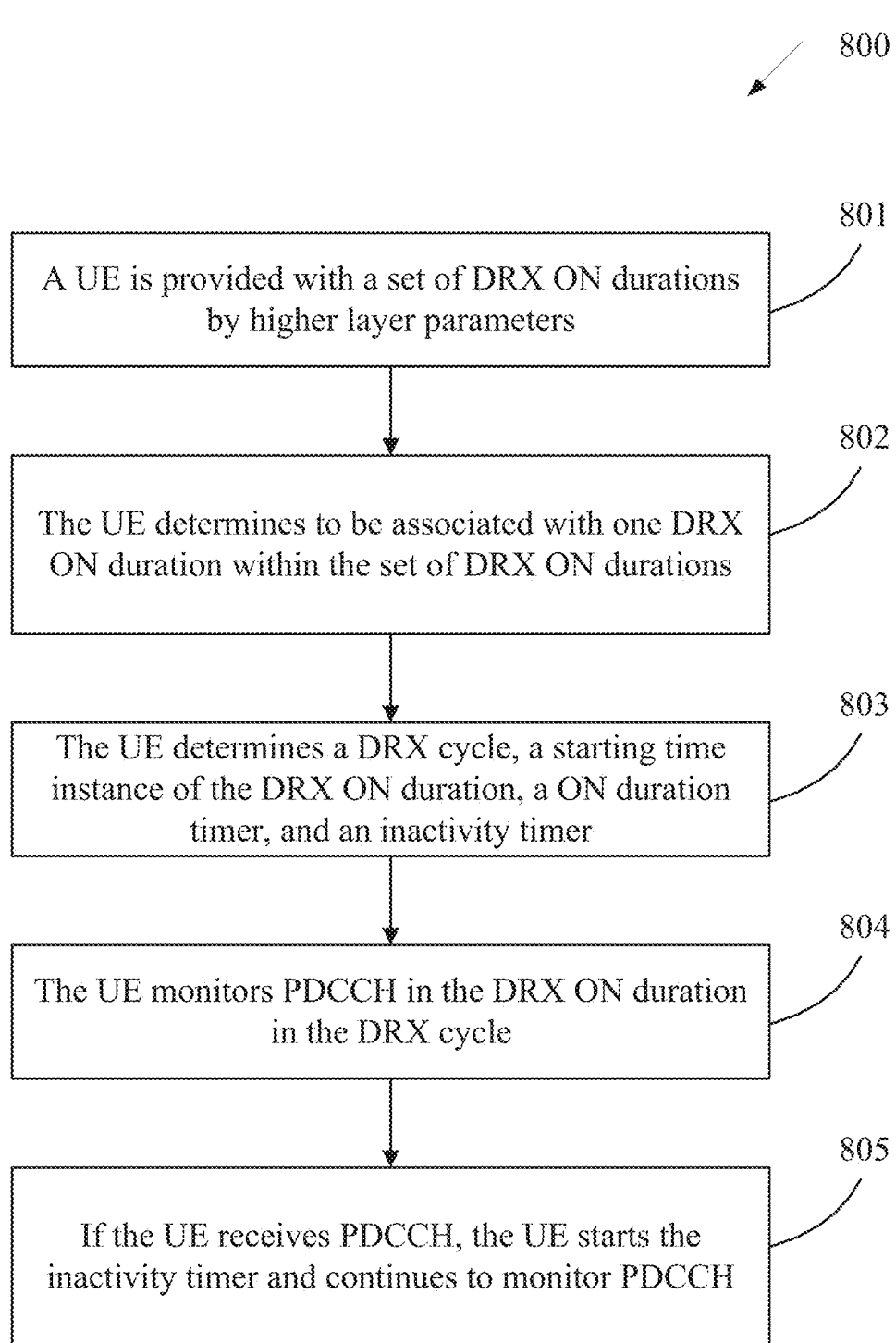

800

801

A UE is provided with a set of DRX ON durations by higher layer parameters

802

The UE determines to be associated with one DRX ON duration within the set of DRX ON durations

803

The UE determines a DRX cycle, a starting time instance of the DRX ON duration, a ON duration timer, and an inactivity timer

804

The UE monitors PDCCH in the DRX ON duration in the DRX cycle

805

If the UE receives PDCCH, the UE starts the inactivity timer and continues to monitor PDCCH

1001
A UE is provided with a set of DRX ON durations by higher layer parameters

1002
The UE is provided with a WUS-O

1003
The UE monitors PDCCH in the WUS-O

1004
The UE detects PDCCH, and determines the DCI format carried by the PDCCH.

1005
The UE determines whether to monitor PDCCH in the set of DRX ON durations based on an indication in the DCI format.

1

METHOD AND APPARATUS FOR DISCONTINUOUS RECEPTION FOR A GROUP OF USER EQUIPMENTS

CROSS-REFERENCE TO RELATED AND CLAIM OF PRIORITY

The present application claims priority under 35 U.S.C. § 119(e) to U.S. Provisional Patent Application No. 63/392,783 filed on Jul. 27, 2022, which is hereby incorporated by reference in its entirety.

TECHNICAL FIELD

The present disclosure relates generally to wireless communication systems and, more specifically, the present disclosure relates to methods and apparatuses for discontinuous reception (DRX) for a group of user equipments (UEs).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure relates to DRX for a group of UEs.

In an embodiment, a base station (BS) in a wireless communication system is provided. The BS includes a transceiver configured to transmit higher layer parameters and a processor operably coupled to the transceiver. The processor is configured to determine DRX ON durations based on the higher layer parameters, and transmission occasions for physical downlink control channels (PDCCHs) based on the higher layer parameters. A first PDCCH from the PDCCHs provides a downlink control information (DCI) format. The transceiver is further configured to transmit the first PDCCH in at least one transmission occasion from the transmission occasions. The processor is further configured to determine, based on an indication in the DCI format, whether to instruct the transceiver to transmit a second PDCCH within at least one DRX ON duration from consecutive $N_{DRX}$ DRX ON durations that are after the transmission of the first PDCCH. The indication in the DCI format is a bitmap of size $N_{DRX}$ and $N_{DRX}$ bits in the bitmap are respectively associated with the $N_{DRX}$ DRX ON durations.

In another embodiment, a UE in a wireless communication system is provided. The UE includes a transceiver configured to receive higher layer parameters and a processor operably coupled to the transceiver. The processor is configured to determine discontinuous reception (DRX) ON durations based on the higher layer parameters and reception occasions for physical downlink control channels (PDCCHs) based on the higher layer parameters. A first PDCCH from the PDCCHs provides a downlink control information (DCI) format. The transceiver is further configured to receive the first PDCCH in at least one reception occasion from the reception occasions. The processor is further configured to determine based on an indication in the DCI format, whether to instruct the transceiver to receive a second PDCCH in at least one DRX ON duration from consecutive $N_{DRX}$ DRX ON durations that are after the reception of the first PDCCH. The indication in the DCI format is a bitmap of size $N_{DRX}$ and $N_{DRX}$ bits in the bitmap are respectively associated with the $N_{DRX}$ DRX ON durations.

In yet another embodiment, a method of a UE in a wireless communication system is provided. The method includes receiving higher layer parameters and determining DRX ON durations based on the higher layer parameters and reception occasions for physical downlink control channels (PDCCHs) based on the higher layer parameters. A first PDCCH from the PDCCHs provides a downlink control information (DCI) format. The method further includes receiving the first PDCCH in at least one reception occasion from the reception occasions and determining based on an indication in the DCI format, whether to receive a second PDCCH in at least one DRX ON duration from consecutive $N_{DRX}$ DRX ON durations that are after the reception of the first PDCCH. The indication in the DCI format is a bitmap of size $N_{DRX}$ and $N_{DRX}$ bits in the bitmap are respectively associated with the $N_{DRX}$ DRX ON durations.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example of a flowchart of a UE procedure according to embodiments of the present disclosure;

DETAILED DESCRIPTION

FIGS. 1-10, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" and [5] 3GPP TS 38.331 v16.1.0, "NR; Radio Resource Control (RRC) Protocol Specification."

Figure 1:
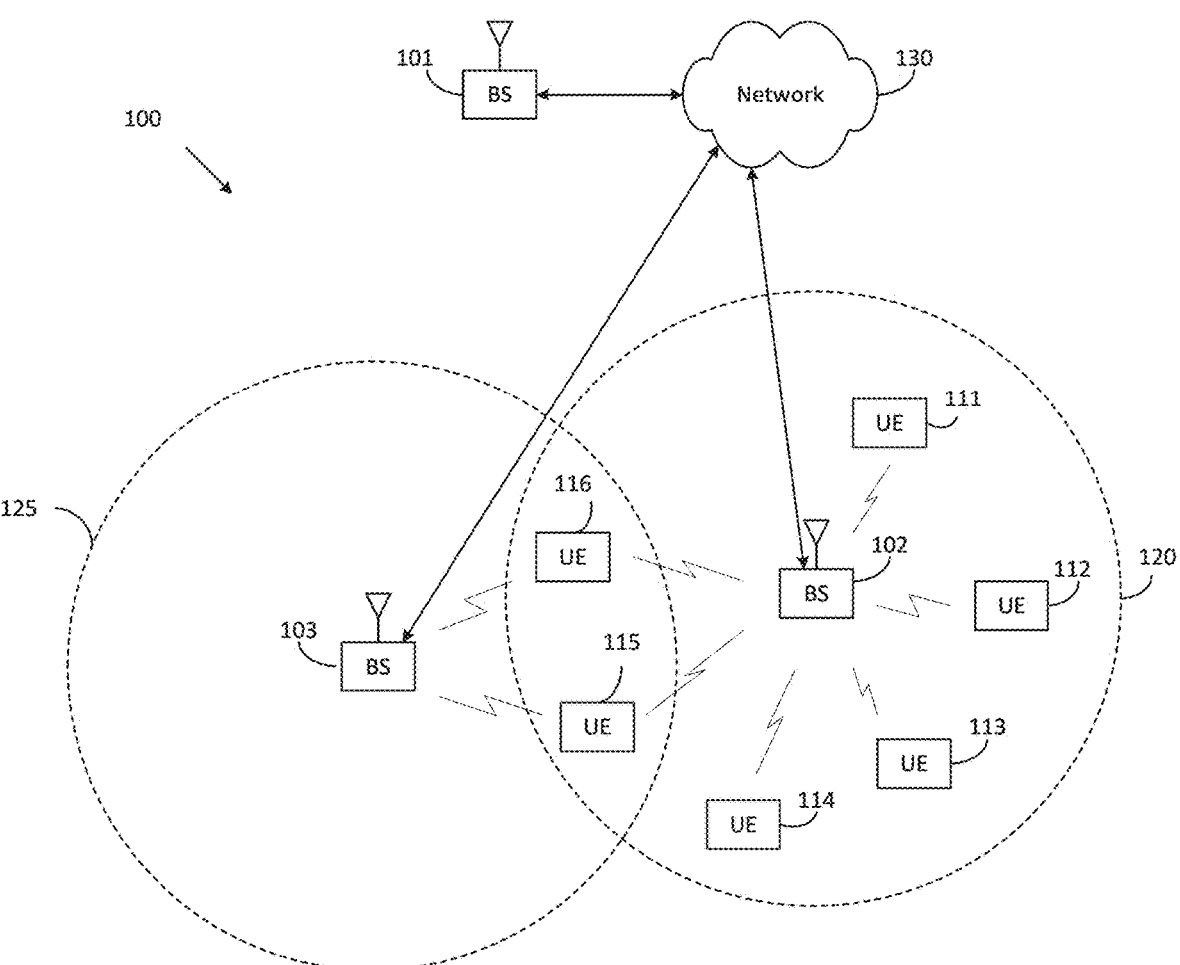
FIG. 1 illustrates an example wireless network according to embodiments of the present disclosure.
Figure 2:
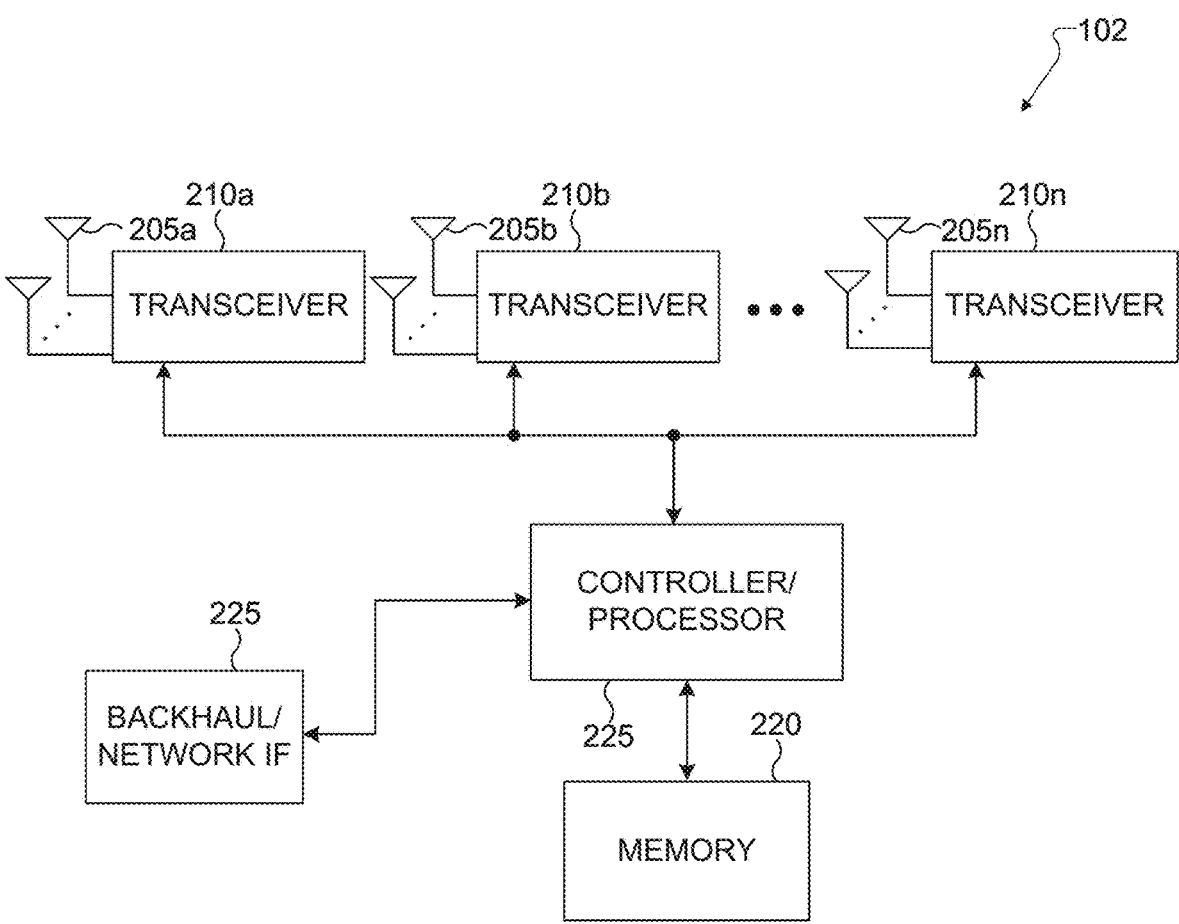
FIG. 2 illustrates an example UE according to embodiments of the present disclosure.
Figure 3:
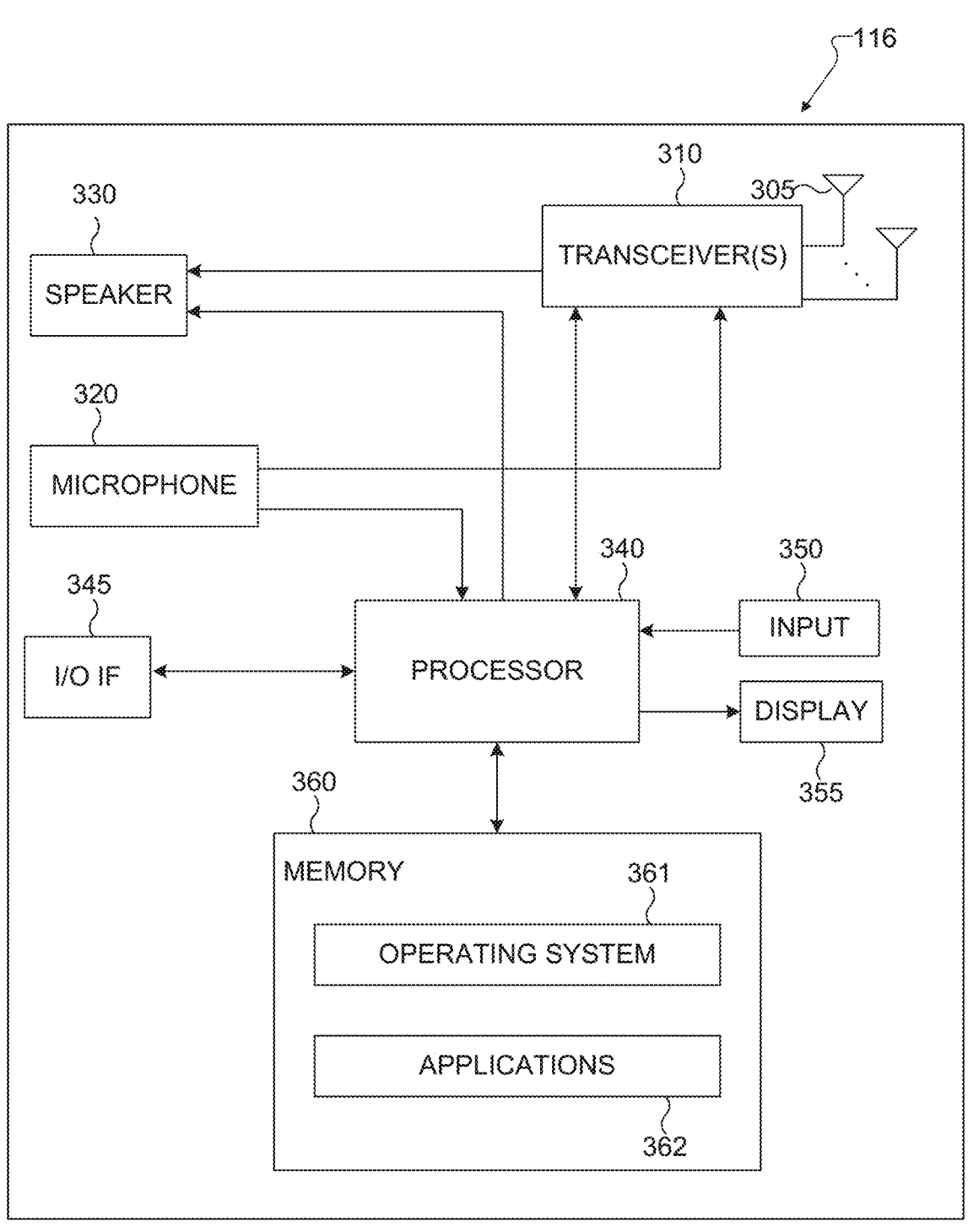
FIG. 3 illustrates an example BS according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, longterm evolution (LTE), longterm evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing DRX for a group of UEs. In certain embodiments, one or more of the BSs 101-103 include circuitry, programing, or a combination thereof to support DRX for a group of UEs.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting DRX for a group of UEs. Any of a wide variety of other functions could be supported in the gNB 102 by the controller/processor 225.

The controller/processor 225 is also capable of executing programs and other processes resident in the memory 230, such as processes for DRX for a group of UEs. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the ULE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for utilizing DRX for a group of UEs as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
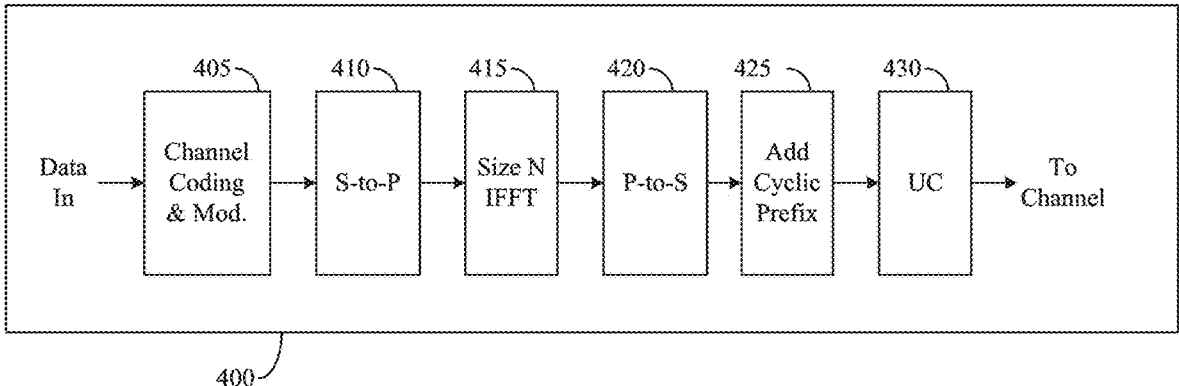
FIG. 4A and FIG. 4B illustrate examples of wireless transmit and receive paths according to embodiments of the present disclosure.
Figure 4B:
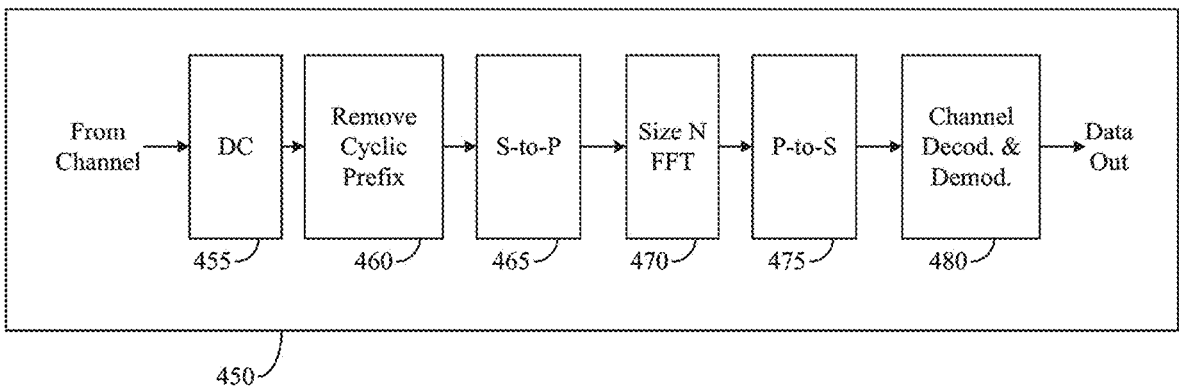

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support DRX for a group of UEs as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal.

The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
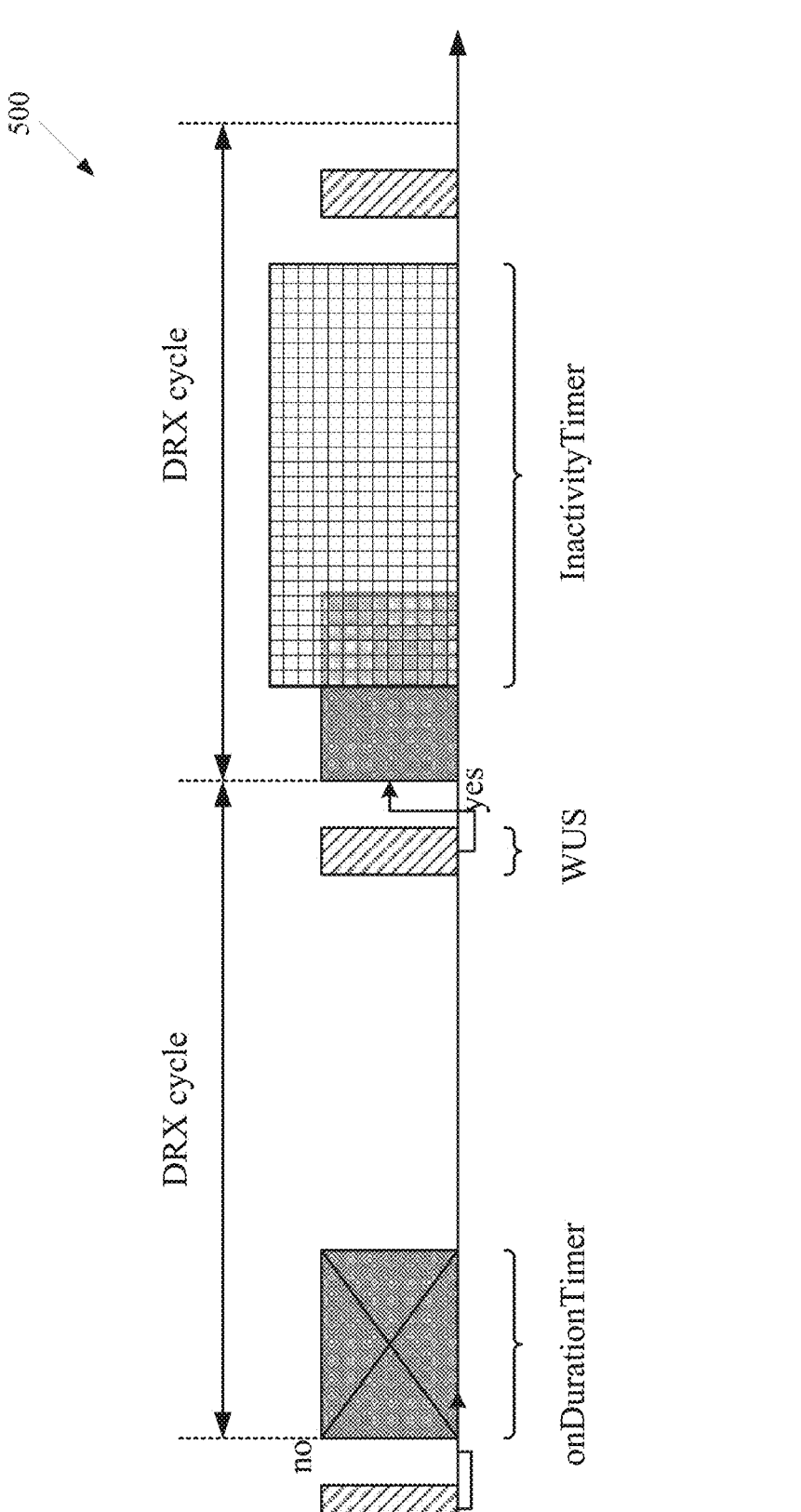
FIG. 5 illustrates an example of DRX according to embodiments of the present disclosure.

FIG. 5 illustrates an example architecture 500 for DRX according to embodiments of the present disclosure. For example, the architecture 500 can be utilized by one or more of UEs 111-116 in FIG. 1. This example is for illustration only and other embodiments can be used without departing from the scope of the present disclosure.

Embodiments of the present disclosure recognize that NR supports a UE's DRX, wherein the UE 116 can be configured with a DRX cycle periodically showing up associated with an ON duration timer (e.g., onDurationTimer) and an inactivity timer (e.g., InactivitityTimer). The UE 116 can be further configured with a wake-up-signal (WUS), which is a downlink control information (DCI) format, and if the WUS indicates the UE 116 to monitor physical downlink control information (PDCCH) in the duration of onDurationTimer, the UE 116 monitors PDCCH in the duration of onDurationTimer starting from the beginning of the DRX cycle. If the UE 116 receives any PDCCH in the duration of onDurationTimer, the UE 116 starts the duration of Inactivity-Timer immediately and continues to monitor the PDCCH within the duration of InactivityTimer. An illustration of DRX is shown in FIG. 5.

Figure 6:
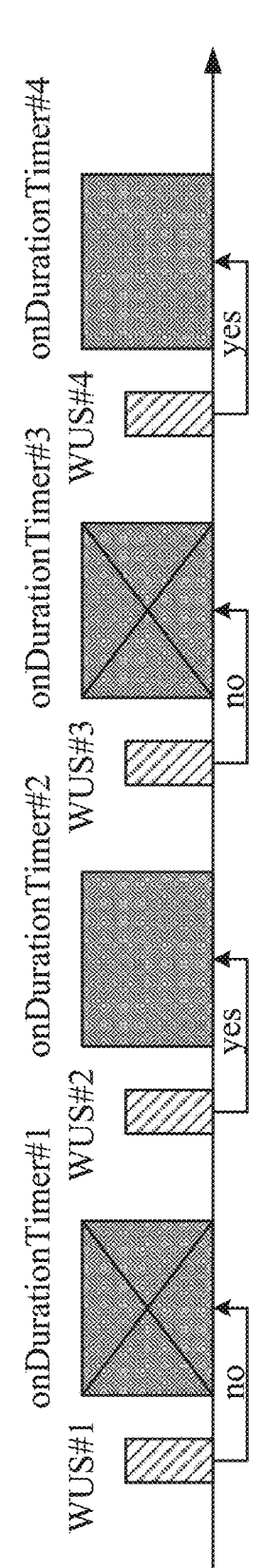
FIG. 6 illustrates an example of DRX for multiple UEs according to embodiments of the present disclosure.

FIG. 6 illustrates an example architecture 600 of DRX for multiple UEs according to embodiments of the present disclosure. For example, architecture 600 can be utilized by one or more of UEs 111-116 in FIG. 1. This example is for illustration only and other embodiments can be used without departing from the scope of the present disclosure.

When multiple UEs are configured with DRX, the ON duration of the DRX cycle may not be aligned for the multiple UEs, and from the gNB 102's perspective, transmissions may happen in the corresponding ON duration when traffic comes before the corresponding ON duration, such that the transmissions may not be continuous.

While DRX facilitates UE energy savings, it does not help with gNB's energy savings. Further, gNB cannot fully rely on scheduling to align the DRX ON duration, since the traffic from UEs is not predicable. Also, using a UE specific indication (e.g., WUS) consumes additional energy for gNB. So, it's beneficial and necessary to support a DRX mechanism for a group of UEs, such that both UEs and gNB are able to realize energy savings. This disclosure focuses on aspects related to energy savings including configuration and indication.

The discontinuous transmission burst from the gNB 102's perspective may not save gNB's energy, and cannot fully rely on scheduling to try to align the DRX ON duration, since the traffic from UEs is not predicable. Also, using a UE specific indication (e.g., WUS) also consumes gNB's extra energy. For this, it's beneficial and necessary to support a DRX mechanism for a group of UEs, and this disclosure focuses on related aspects including configuration and indication.

Embodiments of the present disclosure provide DRX for a group of UEs and include the following aspects: Configuration of DRX for a group of UEs; a UE procedure for the set of DRX ON durations; WUS for the group of UEs; a UE procedure for receiving WUS.

Figure 7:
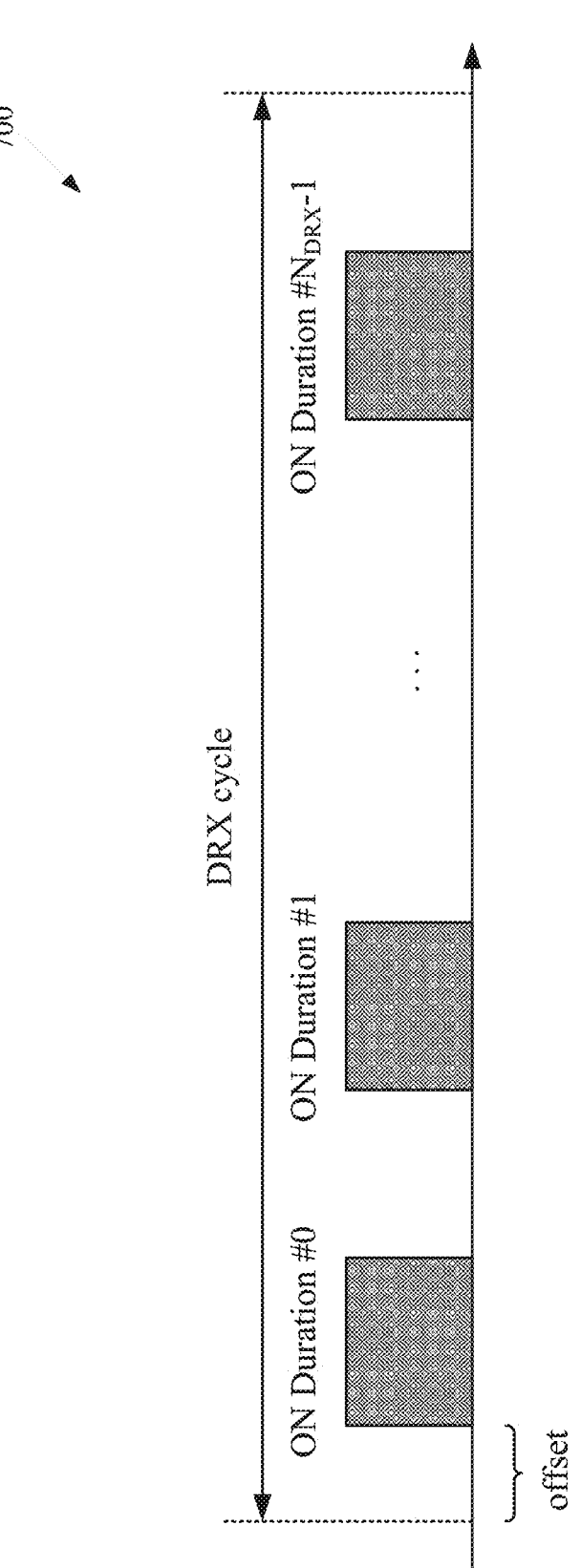
FIG. 7 illustrates an example of a set of DRX ON durations according to embodiments of the present disclosure.

FIG. 7 illustrates an example architecture 700 for a set of DRX ON durations according to embodiments of the present disclosure. For example, architecture 700 can be utilized by one or more of UEs 111-116 in FIG. 1. This example is for illustration only and other embodiments can be used without departing from the scope of the present disclosure.

In one embodiment, a group of UE(s) can be configured with a set of DRX ON durations, e.g., the starting time instance of each DRX ON duration in the set of DRX ON durations can be denoted as $$T_{start,i}^{DRX},$$

and the duration of each DRX ON duration in the set of DRX ON durations can be denoted as $$T_{duraiton,i}^{DRX},$$

wherein i is the index of each DRX ON duration in the set of DRX ON durations, with $0 \leq i \leq N_{DRX}-1$ and $N_{DRX}$ is a number of DRX ON durations in the set of DRX ON durations.

In one example, the number of DRX ON durations in the set of DRX ON durations (e.g., $N_{DRX}$) can be provided by higher layer parameter, e.g., associated with the configuration for the set of DRX ON durations.

In one example, the set of DRX ON durations has a same value of the ON duration, e.g., associated with the configuration for the set of DRX ON durations. For instance, $$T_{duraiton,i}^{DRX}$$

is common for all DRX ON durations, and its value can be provided by a common higher layer parameter.

In another example, each DRX ON duration in the set of DRX ON durations can have a separate value of the ON duration, e.g., associated with the configuration of each DRX ON duration in the set of DRX ON durations. For instance, $$T_{duraiton,i}^{DRX}$$

is separately configured for each DRX ON duration (e.g., by higher layer parameter), and associated with the configuration for $$T_{start,i}^{DRX}.$$

In one example, the set of DRX ON durations doesn't overlap. For instance, $$T_{start,i}^{DRX} + T_{duraiton,i}^{DRX} \leq T_{start,i+1}^{DRX}$$

for $0 \leq i \leq N_{DRX}-2$.

In one example, the set of DRX ON durations doesn't overlap, and occupies a contiguous number of symbols or slots or frames in the time domain. For instance, $$T_{start,i}^{DRX} + T_{duraiton,i}^{DRX} = T_{start,i+1}^{DRX}$$

for $0 \leq i \leq N_{DRX}-2$. For this example, the duration of the DRX ON duration can be equal to the interval between the starting time instances of two neighboring DRX ON durations.

In one example, the starting instances of the set of DRX ON durations have a common interval. For instance, $$T_{start,i}^{DRX} - T_{start,i-1}^{DRX}$$

is the same for $0 \leq i \leq N_{DRX}-2$. For another instance, this interval can be configured by higher layer parameter to determine the starting instances of the set of DRX ON durations, e.g., $$T_{start,i}^{DRX} = T_{offset}^{DRX} + (i-1) \cdot T_{interval}^{DRX},$$

wherein $$T_{offset}^{DRX}$$

is a common offset for the set of DRX ON durations and $$T_{interval}^{DRX}$$

is an interval between neighboring DRX ON durations.

In one example, the set of DRX ON durations has a same DRX cycle, e.g., associated with the configuration for the set of DRX ON durations, and its value can be provided by a common higher layer parameter.

In another example, each DRX ON duration in the set of DRX ON durations can have a separate DRX cycle (e.g., provided by higher layer parameter), e.g., associated with the configuration of each DRX ON duration in the set of DRX ON durations.

In one example, the set of DRX ON durations has a same offset to determine the first DRX ON duration within the set of DRX ON durations, e.g., associated with the configuration for the set of DRX ON durations, and its value can be provided by a common higher layer parameter.

In another example, each DRX ON duration in the set of DRX ON durations can have a separate offset to determine the starting time instance of the DRX ON duration (e.g., provided by higher layer parameter), e.g., associated with the configuration of each DRX ON duration in the set of DRX ON durations.

In one example, the set of DRX ON durations has a same inactivity timer associated with the set of DRX ON durations, e.g., associated with the configuration for the set of DRX ON durations, and its value can be provided by a common higher layer parameter.

In another example, each DRX ON duration in the set of DRX ON durations can be associated with an inactivity timer (e.g., provided by higher layer parameter), e.g., associated with the configuration of each DRX ON duration in the set of DRX ON durations.

In one embodiment, there can be an association between the set of DRX ON durations and a group of UEs. From a UE perspective, the UE 116 can determine the association with one DRX ON duration within the set of DRX ON durations.

In one example, the association between the set of DRX ON durations and a group of UEs can be configured by the gNB 102. For instance, the gNB 102 can configure a group of UEs for each DRX ON duration within the set of DRX ON durations.

In another example, the association between the set of DRX ON durations and a group of UEs can be determined based on the UE identity (ID). For instance, a group of UEs is associated with a DRX ON duration with index i, if the UE ID in the group of UEs satisfies ($N_{ID}$ mod K)=i, wherein K is the number of groups of UEs. For another instance, a group of UEs is associated with a DRX ON duration with index i, if the UE ID in the group of UEs satisfies $\lfloor N_{ID}/K \rfloor$=i, wherein K is the number of groups of UEs. For one sub-instance of above instances, $K=N_{DRX}$. For another sub-instance of above instances, K can be provided by higher layer parameter.

In yet another example, the association between the set of DRX ON durations and a group of UEs can be determined based on an indication in a DCI format, e.g., according to an example in the disclosure.

In yet another example, the UE 116 only expects to monitor PDCCH in one of the DRX ON duration within the set of DRX ON durations in a DRX cycle.

In one example, the group of UEs can be all the UEs served by the gNB 102.

In another example, the group of UEs can be all the UEs in RRC_CONNECTED state and served by the gNB 102.

In yet another example, the group of UEs can be determined by the gNB 102, e.g., by a configuration from the gNB 102.

FIG. 8 illustrates an example of a flowchart of method 800 of UE procedure according to embodiments of the present disclosure. For example, the method 800 can be performed by any of the UEs 111-116 of FIG. 1. The method 800 is for illustration only and other embodiments can be used without departing from the scope of the present disclosure.

In one instance, the example UE procedure is applicable when a wake-up-signal (WUS) for the set of DRX ON durations is not configured. A UE can be provided with a set of DRX ON durations by higher layer parameters (801). The UE 116 determines to be associated with at least one DRX ON duration within the set of DRX ON durations (802), e.g., according to example(s) in this disclosure. The UE 116 determines parameters for the associated DRX ON duration, including at least one of a DRX cycle, a starting time instance of the DRX ON duration, an ON duration timer, or an inactivity timer (803). The UE 116 monitors PDCCH in the associated DRX ON duration, with a duration provided by the ON duration timer (804). If the UE 116 monitors PDCCH before the ON duration timer expires, the UE 116 starts the inactivity timer and continues to monitor PDCCH with a duration provided by the inactivity timer (805); otherwise, the UE 116 stops monitoring PDCCH in the DRX cycle and starts to monitor PDCCH in the associated ON duration of the next DRX cycle.

Figure 9:
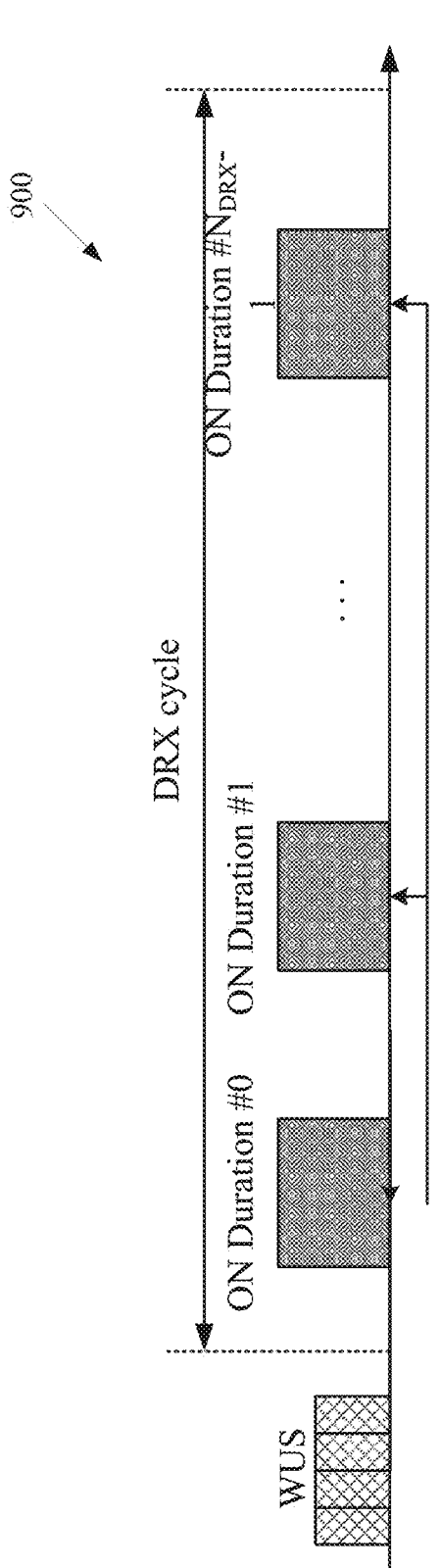
FIG. 9 illustrates an example WUS for the set of DRX ON durations according to embodiments of the present disclosure.

FIG. 9 illustrates an example wake-up-signal (WUS) 900 for the set of DRX ON durations according to embodiments of the present disclosure. For example, the WUS 900 can be sent by the gNB 102 into any of the UEs 111-116 in FIG. 1. The WUS 900 is for illustration only and other embodiments can be used without departing from the scope of the present disclosure.

In one embodiment, there can be a wake-up-signal (WUS) for the group of UEs supported for the set of DRX ON durations.

In one example, the WUS occasion (WUS-O) for the group of UEs can be a set of PDCCH monitoring occasions (MOs). For instance, the WUS-O includes $N_1 \cdot N_2$ PDCCH MOs. In one instance, a UE only needs to monitor PDCCH in one MO within the set of PDCCH MOs, e.g., based on an indication from the higher layer parameters, or based on the UE ID. In another instance, a UE needs to monitor PDCCH in multiple MOs within the set of PDCCH MOs, wherein e.g., the RS of the PDCCH in the multiple (e.g. $N_2$) MOs are assumed to be QCLed, and e.g., based on an indication from the higher layer parameters, or based on the UE ID.

In one sub-example, $N_1=N_2=1$, and WUS-O includes a single PDCCH MO. For this sub-example, WUS-O can be a same PDCCH MO.

In another sub-example, $N_1$ can be a number of beams for beam sweeping. For one instance, $N_1=N_{DRX}$, e.g., MO corresponding to the same beam index can be associated with the same DRX ON Duration in the set of DRX ON durations. For another instance, $N_1$ can be provided by a higher layer parameter. For yet another instance, $N_1$ can be the number of transmitted synchronization signal/physical broadcast channel (SS/PBCH) blocks. For yet another instance, $N_1=K$, wherein K is the number of groups of UEs as described in the disclosure. For this instance, there can be an association between an UE ID and the MO #(x·$N_1$+k), wherein $0 \le x \le N_2-1$, and $0 \le k \le N_1-1$. For one sub-instance, if the UE ID in the group of UEs satisfies ($N_{ID}$ mod K)=k, the group of UEs are associated with MO #(x·$N_1$+k). For another sub-instance, if the UE ID in the group of UEs satisfies $\lfloor N_{ID}/K \rfloor$=k, the group of UEs are associated with MO #(x·$N_1$+k).

In yet another sub-example, $N_2$ can be a number of repetitions. For one instance, the UE 116 can assume the $N_1$ number of MOs are repeated $N_2$ times, e.g., the reference signal (RS) associated with the PDCCH candidate in the MO #(x·$N_1$+k) can be assumed to be quasi co-located (QCLed) with the RS associated with the PDCCH candidate in the MO #k, wherein $0 \le x \le N_2-1$, and $0 \le k \le N_1-1$. For another instance, $N_2=1$ and there is no repetition supported. For yet another instance, $N_2$ can be provided by a higher layer parameter. For yet another instance, the UE 116 assumes $N_2=1$ if the higher layer parameter is not provided.

In yet another sub-example, the reference signal (RS) associated with the PDCCH candidate in the MO #(x·$N_1$+k) can be assumed to be quasi co-located (QCLed) with the RS associated with the PDCCH candidate in the DRX ON duration #k, wherein $0 \le x \le N_2-1$, and $0 \le k \le N_1-1$.

In another example, the time location of the WUS-O can be determined based on a time reference point and a time offset compared to the time reference point (e.g., before the time reference point).

In one instance, the time reference point can be the start of the DRX cycle.

In another instance, the time reference point can be the start of the DRX ON duration of the first DRX ON duration in the DRX cycle.

In one instance, the time offset can be provided by higher layer parameter.

In one instance, after applying the time offset, the UE 116 can determine the first PDCCH MO of the WUS-O.

In yet another example, the UE 116 can be provided with an indication of the DCI format to monitor the PDCCH candidates. For one instance, the DCI format can be DCI format 2_0. For another instance, the DCI format can be DCI format 2_6. For yet another instance, the DCI format can be DCI format 2_7. For yet another instance, the DCI format can be a new DCI format.

In yet another example, the DCI format can include an indication of whether or not to monitor PDCCH and/or start a DRX ON duration timer.

In one instance, the indication can be a bitmap with length $N_{DRX}$, and each bit is associated with a group of UEs (e.g., the (i+1)-th bit in the bitmap is associated with the group #i of UEs, wherein the association can be configured by higher layer parameters or determined based on the UE's ID) or a DRX ON duration in the set of DRX ON durations (e.g., the DRX ON duration #i).

For example, a bit in the bitmap (e.g., the (i+1)-th bit in the bitmap) taking a value of 1 indicates a group of UEs (e.g., the group #i of UEs) to monitor PDCCH in the corresponding DRX ON duration (e.g., the DRX ON duration #i) and/or to start the corresponding DRX ON duration timer (e.g., for the DRX ON duration #i) in the DRX cycle;

For another example, a bit in the bitmap (e.g., the (i+1)-th bit in the bitmap) taking a value of 0 indicates a group of UEs (e.g., the group #i of UEs) not to monitor PDCCH and/or not to start DRX ON duration timer in the DRX cycle.

In another instance, the indication can be a bitmap with length $N_DRx$, and each bit is associated with a group of UEs (e.g., the (i+1)-th bit in the bitmap is associated with the group #i of UEs, wherein the association can be configured by higher layer parameters or determined based on the UE's ID) or a DRX ON duration in the set of DRX ON durations (e.g., the DRX ON duration #i).

For example, a bit in the bitmap (e.g., the (i+1)-th bit in the bitmap) taking a value of 1 indicates a group of UEs (e.g., the group #i of UEs) to monitor PDCCH in the corresponding DRX ON duration (e.g., the DRX ON duration #f(i)) and/or to start the corresponding DRX ON duration timer (e.g., for the DRX ON duration #f(i)) in the DRX cycle, wherein $$f(i) = \sum_{k=1}^{i+1} b_k$$

(e.g., a number of is before and including the (i+1)-th bit in the bitmap, and $b_k$ is the value of bit k in the bitmap);

For another example, a bit in the bitmap (e.g., the (i+1)-th bit in the bitmap) taking a value of 0 indicates a group of UEs (e.g., the group #i of UEs) not to monitor PDCCH and/or not to start DRX ON duration timer in the DRX cycle.

In yet another instance, the indication can be a bitmap with length $N_{sub-group} \cdot N_{DRX}$, wherein $N_{sub-group}$ is a number of sub-groups in a group of UEs (e.g., provided by higher layer parameter), and each bit is associated with a sub-group of UEs (e.g., the (i·$N_{DRX}$+j+1)-th bit in the bitmap is associated with the sub-group #(i·$N_{DRX}$+j) of UEs, wherein the association can be configured by higher layer parameters or determined based on the UE's ID) or a DRX ON duration in the set of DRX ON durations (e.g., the DRX ON duration #i).

For example, a bit in the bitmap (e.g., the (i·$N_{DRX}$+j+1)-th bit in the bitmap) taking a value of 1 indicates a group of UEs (e.g., the group #(i·$N_{DRX}$+j) of UEs) to monitor PDCCH in the corresponding DRX ON duration (e.g., the DRX ON duration #i) and/or to start the corresponding DRX ON duration timer (e.g., for the DRX ON duration #i) in the DRX cycle;

For another example, a bit in the bitmap (e.g., the (i·$N_{DRX}$+j+1)-th bit in the bitmap) taking a value of 0 indicates a group of UEs (e.g., the group #(i·$N_{DRX}$+j) of UEs) not to monitor PDCCH and/or not to start DRX ON duration timer in the DRX cycle.

In yet another instance, the indication can be a bitmap with length $N_{DRX}$, and each bit is associated with a group of UEs (e.g., the (i·$N_{DRX}$+j+1)-th bit in the bitmap is associated with the group #i of UEs, wherein the association can be configured by higher layer parameters or determined based on the UE's ID) or a DRX ON duration in the set of DRX ON durations (e.g., the DRX ON duration #i).

For example, a bit in the bitmap (e.g., the (i·$N_{DRX}$+j+1)-th bit in the bitmap) taking a value of 1 indicates a group of UEs (e.g., the group #i·$N_{DRX}$+j of UEs) to monitor PDCCH in the corresponding DRX ON duration (e.g., the DRX ON duration #f(i)) and/or to start the corresponding DRX ON duration timer (e.g., for the DRX ON duration #f(i)) in the DRX cycle, wherein $$f(i) = \sum_{k=1}^{i+1} b'_k \text{ and } b'_k = 1$$

if any of $b_{(k-1) \cdot N_{DRX}}, \ldots, b_{k \cdot N_{DRX}-1}$ is 1; otherwise b'$_k$=0 (e.g., $b_k$ is the value of bit k in the bitmap).

For another example, a bit in the bitmap (e.g., the (i·$N_{DRX}$+j+1)-th bit in the bitmap) taking a value of 0 indicates a group of UEs (e.g., the group #(i·$N_{DRX}$+j) of UEs) not to monitor PDCCH and/or not to start DRX ON duration timer in the DRX cycle.

In yet another example, if the UE 116 didn't detect the WUS information from the WUS-O, the UE 116 can follow the legacy procedure according to example of this disclosure (e.g., example in FIG. 8).

In one embodiment, the UE 116 monitor PDCCH in the WUS-O, according to one or more examples described herein.

In one example, the PDCCH MOs for WUS can be determined according to a common search space set. In one instance, the common search space (CSS) set can be a Type3-PDCCH CSS set. In another instance, the CSS set can be a new type of CSS set.

In another example, the UE 116 monitors one WUS-O per DRX cycle.

In yet another example, WUS-O can be supported at least for RRC_CONNECTED state.

In yet another example, in multi-beam operations, the UE 116 assumes that the same WUS information for the group of UEs is repeated in all transmitted beams. Further, the selection of the beam(s) for reception of the WUS information can be up to the UE 116's implementation, e.g., at least for the case that the UE 116 is not provided with a configuration on the beam for reception of the WUS information. For example, the UE can be indicated to monitor PDCCH in a first control resource set (CORESET) associated with a first transmission configuration indication (TCI) state and to monitor PDCCH in a second CORESET associated with a second TCI state. Prior to a same DRX cycle, the UE can receive a first PDCCH in the first CORESET providing a first DCI format with an indication for whether or not the UE shall monitor PDCCH in ON durations of subsequent consecutive DRX cycles, and a second PDCCH in the second CORESET providing a second DCI format with the same indication as the first DCI format.

In yet another example, the PDCCH MOs for WUS which do not overlap with UL symbols (e.g., provided by time division duplex (TDD) UL/DL configuration) can be sequentially numbered from zero starting from the first PDCCH monitoring occasion for WUS in the WUS-O.

In yet another example, when the detects WUS information within a WUS-O, the UE 116 is not required to monitor the subsequent monitoring occasion(s) associated with the same WUS-O.

In yet another example, if the UE 116 monitors PDCCH MOs for WUS information according to a CSS set, and the UE 116 is indicated to skip PDCCH monitoring, the UE 116 can keep monitoring PDCCH MOs for WUS information (e.g., ignoring the indication of skipping PDCCH monitoring for WUS).

Figure 10:
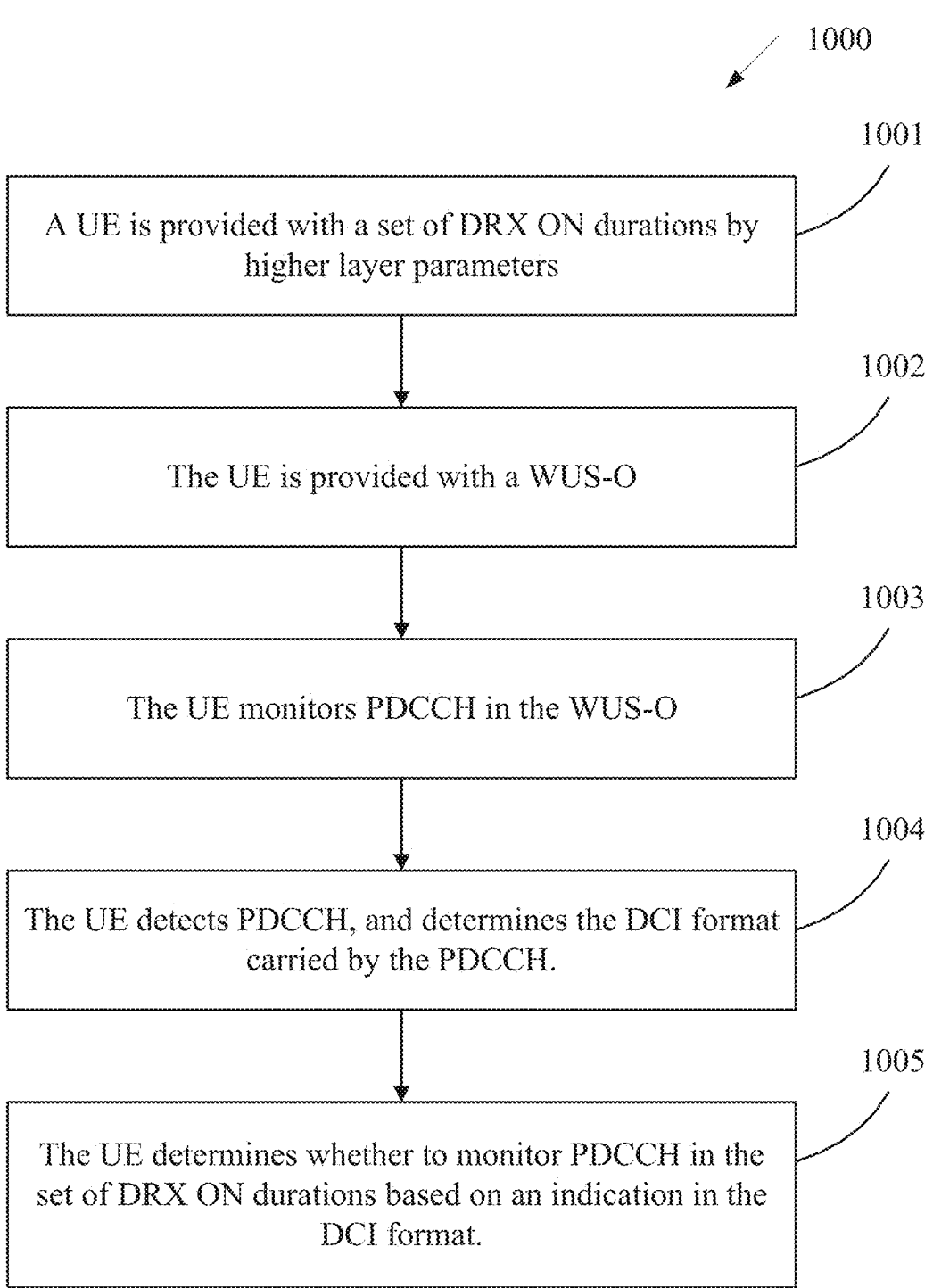
FIG. 10 illustrates an example of a flowchart of a UE procedure according to embodiments of the present disclosure.

FIG. 10 illustrates an example of a flowchart of method 1000 for a UE procedure according to embodiments of the present disclosure. For example, method 1000 of FIG. 10 can be performed by any of the UEs 111-116 of FIG. 1, such as UE 116 of FIG. 3, and a corresponding method can be performed by any of the BSs 101-103 of FIG. 1, such as gNB 102 of FIG. 2. The method 1000 is for illustration only and other embodiments can be used without departing from the scope of the present disclosure.

A UE can be provided with a set of DRX ON durations by higher layer parameters (1001). The UE 116 can be further provided with a configuration for WUS-O (1002). The UE 116 monitors PDCCH in the MOs included in the WUS-O (1003). If the UE 116 detects PDCCH, the UE 116 can determine the DCI format carried by the PDCCH (1004). The UE 116 can further determine whether or not to monitor PDCCH and/or start a DRX ON duration timer in the set of DRX ON durations, based on an indication in the DCI format, according to one or more examples of this disclosure (1005).

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A base station (BS) in a wireless communication system, the BS comprising:
a transceiver configured to transmit higher layer parameters; and
a processor operably coupled to the transceiver, the processor configured to determine:
discontinuous reception (DRX) ON durations based on the higher layer parameters, and
transmission occasions for physical downlink control channels (PDCCHs) based on the higher layer parameters, wherein a first PDCCH from the PDCCHs provides a downlink control information (DCI) format,
wherein the transceiver is further configured to transmit the first PDCCH in at least one transmission occasion from the transmission occasions,
wherein the processor is further configured to determine, based on an indication in the DCI format, whether to instruct the transceiver to transmit a second PDCCH within at least one DRX ON duration from consecutive $N_{DRX}$ DRX ON durations that are after the transmission of the first PDCCH, and
wherein:

the indication in the DCI format is a bitmap of size $N_{DRX}$, and
$N_{DRX}$ bits in the bitmap are respectively associated with the $N_{DRX}$ DRX ON durations.

2. The BS of claim 1, wherein:
the DRX ON durations do not overlap in time domain,
the transceiver is further configured to transmit, via higher layer signaling, an offset for the DRX ON durations and an interval between consecutive DRX ON durations, and
the processor is further configured to determine, based on the offset and the interval, the DRX ON durations.

3. The BS of claim 1, wherein:
the DRX ON durations have a common DRX cycle, and
the higher layer parameters include the common DRX cycle.

4. The BS of claim 1, wherein:
the processor is further configured to determine, based on a time offset to the DRX ON durations, time domain locations of the transmission occasions, and
the transceiver is further configured to transmit information indicating the time offset via higher layer signaling.

5. The BS of claim 1, wherein the transceiver is further configured to transmit, via higher layer signaling, information indicating at least one transmission occasion from the transmission occasions for the PDCCHs.

6. The BS of claim 1, wherein the transceiver is further configured to transmit, via higher layer signaling, an indication to a user equipment (UE) for a location of the bitmap in the DCI format.

7. The BS of claim 1, wherein:
the transmission occasions for the PDCCHs include $N_1 \cdot N_2$ transmission occasions, where $N_1$ is a number of beams and $N_2$ is a number of transmission occasions corresponding to one beam,
the higher layer parameters include $N_1$ and $N_2$, and
a first reference signal (RS) associated with PDCCH transmissions in a $(x \cdot N_1 + k)$-th transmission occasion is quasi co-located with a second RS associated with PDCCH transmissions in a k-th transmission occasion, wherein $0 \leq x \leq N_2 - 1$, and $0 \leq k \leq N_1 - 1$.

8. A user equipment (UE) in a wireless communication system, the UE comprising:
a transceiver configured to receive higher layer parameters; and
a processor operably coupled to the transceiver, the processor configured to determine:
discontinuous reception (DRX) ON durations based on the higher layer parameters, and
reception occasions for physical downlink control channels (PDCCHs) based on the higher layer parameters, wherein a first PDCCH from the PDCCHs provides a downlink control information (DCI) format,
wherein the transceiver is further configured to receive the first PDCCH in at least one reception occasion from the reception occasions,
wherein the processor is further configured to determine, based on an indication in the DCI format, whether to instruct the transceiver to receive a second PDCCH within at least one DRX ON duration from consecutive $N_{DRX}$ DRX ON durations that are after the reception of the first PDCCH, and
wherein:
the indication in the DCI format is a bitmap of size $N_{DRX}$, and $N_{DRX}$ bits in the bitmap are respectively associated with the $N_{DRX}$ DRX ON durations.

9. The UE of claim 8, wherein:

the DRX ON durations do not overlap in time domain, the transceiver is further configured to receive, via higher layer signaling, an offset for the DRX ON durations and an interval between consecutive DRX ON durations, and the processor is further configured to determine, based on the offset and the interval, the DRX ON durations.

10. The UE of claim 8, wherein:

the DRX ON durations have a common DRX cycle, and the higher layer parameters include the common DRX cycle.

11. The UE of claim 8, wherein:

the transceiver is further configured to receive, via higher layer signaling, information indicating a time offset to the DRX ON durations; and the processor is further configured to determine, based on the time offset to the DRX ON durations, time domain locations of the reception occasions for the PDCCHs.

12. The UE of claim 8, wherein the transceiver is further configured to receive, via higher layer signaling, information indicating at least one transmission occasion from the transmission occasions for the PDCCHs.

13. The UE of claim 8, wherein the transceiver is further configured to receive, via higher layer signaling, an indication for a location of the bitmap in the DCI format.

14. The UE of claim 8, wherein:

the reception occasions for the PDCCHs include $N_1 \cdot N_2$ reception occasions, where Ny is a number of beams and $N_2$ is a number of transmission occasions corresponding to one beam, the higher layer parameters include $N_1$ and $N_2$, and a first reference signal (RS) associated with PDCCH receptions in a $(x \cdot N_1 + k)$-th reception occasion is quasi co-located with a second RS associated with second PDCCH receptions in a k-th reception occasion, wherein $0 \leq x \leq N_2 - 1$, and $0 \leq k \leq N_1 - 1$.

15. A method of a user equipment (UE) in a wireless communication system, the method comprising:

receiving higher layer parameters;

determining:

discontinuous reception (DRX) ON durations based on the higher layer parameters, and reception occasions for physical downlink control channels (PDCCHs) based on the higher layer parameters, wherein a first PDCCH from the PDCCHs provides a downlink control information (DCI) format;

receiving the first PDCCH in at least one reception occasion from the reception occasions; and determining, based on an indication in the DCI format, whether to receive a second PDCCH in at least one DRX ON duration from consecutive $N_{DRX}$ DRX ON durations that are after the reception of the first PDCCH, wherein:

the indication in the DCI format is a bitmap of size $N_{DRX}$, and $N_{DRX}$ bits in the bitmap are respectively associated with the $N_{DRX}$ DRX ON durations.

16. The method of claim 15, further comprising:

determining the DRX ON durations do not overlap in time domain;

receiving, via higher layer signaling, an offset for the DRX ON durations and an interval between consecutive DRX ON durations;

determining, based on the offset and the interval, the DRX ON durations; and determining:

the reception occasions for the PDCCHs include $N_1 \cdot N_2$ reception occasions, where $N_1$ is a number of beams and $N_2$ is a number of transmission occasions corresponding to one beam, the higher layer parameters include $N_1$ and $N_2$, and a first reference signal (RS) associated with PDCCH receptions in a $(x \cdot N_1 + k)$-th reception occasion is quasi co-located with a second RS associated with PDCCH receptions in a k-th reception occasion, wherein $0 \leq x \leq N_2 - 1$, and $0 \leq k \leq N_1 - 1$.

17. The method of claim 15, wherein:

the DRX ON durations have a common DRX cycle, and the higher layer parameters include the common DRX cycle.

18. The method of claim 15, further comprising:

receiving, via higher layer signaling, information indicating a time offset to the DRX ON durations; and determining, based on the time offset to the DRX ON durations, time domain locations of the reception occasions for the PDCCHs.

19. The method of claim 15, further comprising receiving, via higher layer signaling, information indicating at least one transmission occasion within the reception occasions for the PDCCHs.

20. The method of claim 15, further comprising receiving, via higher layer signaling, an indication for a location of the bitmap in the DCI format.

* * * * *